(12) United States Patent
Andreina et al.

(10) Patent No.: US 11,977,626 B2
(45) Date of Patent: May 7, 2024

(54) SECURING MACHINE LEARNING MODELS AGAINST ADVERSARIAL SAMPLES THROUGH BACKDOOR MISCLASSIFICATION

(71) Applicant: NEC Laboratories Europe GmbH, Heidelberg (DE)

(72) Inventors: Sebastien Andreina, Heidelberg (DE); Giorgia Azzurra Marson, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 394 days.

(21) Appl. No.: 17/342,571

(22) Filed: Jun. 9, 2021

(65) Prior Publication Data
US 2022/0292185 A1 Sep. 15, 2022

Related U.S. Application Data

(60) Provisional application No. 63/158,387, filed on Mar. 9, 2021.

(51) Int. Cl.
*G06F 21/55* (2013.01)
*G06F 18/241* (2023.01)
(Continued)

(52) U.S. Cl.
CPC ............ *G06F 21/55* (2013.01); *G06F 18/241* (2023.01); *G06F 18/2431* (2023.01); *G06N 3/08* (2013.01); *G06V 10/751* (2022.01)

(58) Field of Classification Search
None
See application file for complete search history.

(56) References Cited

U.S. PATENT DOCUMENTS

| 2018/0268142 A1 | 9/2018 | Sethumadhavan et al. |
| 2019/0318099 A1 | 10/2019 | Carvalho et al. |

(Continued)

FOREIGN PATENT DOCUMENTS

| CN | 112084505 A | 12/2020 |
| CN | 112163638 A | 1/2021 |

(Continued)

OTHER PUBLICATIONS

Goodfellow, Ian J., et al., "Explaining and Harnessing Adversarial Examples," arXiv:1412.6572, Conference Paper at International Conference on Learning Representations 2015: 1-11 (Mar. 20, 2015), arXiv, US.

(Continued)

*Primary Examiner* — James R Turchen
(74) *Attorney, Agent, or Firm* — Leydig, Voit & Mayer, Ltd.

(57) ABSTRACT

A method for securing a genuine machine learning model against adversarial samples includes the steps of attaching a trigger to a sample to be classified and classifying the sample with the trigger attached using a backdoored model that has been backdoored using the trigger. In a further step, it is determined whether an output of the backdoored model is the same as a backdoor class of the backdoored model, and/or an outlier detection method is applied to logits compared to honest logits that were computed using a genuine sample. These steps are repeated using different triggers and backdoored models respectively associated therewith. It is compared a number of times that an output of the backdoored models is not the same as the respective backdoor class, and/or a difference determined by applying the outlier detection method, against one or more thresholds so as to determine whether the sample is adversarial.

15 Claims, 4 Drawing Sheets

(51) Int. Cl.
*G06F 18/2431* (2023.01)
*G06N 3/08* (2023.01)
*G06V 10/75* (2022.01)

(56) References Cited

U.S. PATENT DOCUMENTS

| | | | | |
|---|---|---|---|---|
| 2020/0193234 A1* | 6/2020 | Pai | ............ | G06F 16/904 |
| 2020/0201993 A1* | 6/2020 | Anders | ............ | G06N 3/084 |
| 2020/0387752 A1* | 12/2020 | Kursun | ............ | G06F 16/9035 |
| 2021/0019399 A1* | 1/2021 | Miller | ............ | G06V 40/172 |
| 2021/0166797 A1* | 6/2021 | Neumann | ............ | G06N 20/10 |
| 2022/0053005 A1* | 2/2022 | Liu | ............ | G06F 18/22 |
| 2022/0114259 A1* | 4/2022 | Ludwig | ............ | G06F 21/577 |
| 2022/0121647 A1* | 4/2022 | Shishido | ............ | G06F 16/2474 |
| 2022/0171848 A1* | 6/2022 | Srivastava | ............ | G06F 21/55 |
| 2022/0180157 A1* | 6/2022 | Eykholt | ............ | G06N 3/048 |
| 2022/0245243 A1* | 8/2022 | Andreina | ............ | G06F 21/54 |
| 2022/0253714 A1* | 8/2022 | Chen | ............ | G06N 3/088 |
| 2023/0222353 A1* | 7/2023 | Lioutas | ............ | G06N 3/045 |
| | | | | 706/25 |
| 2023/0237345 A1* | 7/2023 | Zahn | ............ | G06N 3/08 |
| | | | | 706/12 |
| 2023/0259619 A1* | 8/2023 | Tsuchida | ............ | G06F 21/556 |
| | | | | 726/26 |

FOREIGN PATENT DOCUMENTS

| | | | | |
|---|---|---|---|---|
| GB | 2585616 A | | 1/2021 | |
| WO | WO-2019014487 A1 * | | 1/2019 | ........... G06F 21/554 |

OTHER PUBLICATIONS

Kurakin, Alexey et al., "Adversarial Examples in the Physical World," arXiv:1607.02533, Workshop at International Conference on Learning Representations 2017: 1-14 (Feb. 11, 2017), arXiv, US.

Carlini, Nicholas and David Wagner, "Towards Evaluating the Robustness of Neural Networks," arXiv:1608.04644, Clinical Orthopedics and Related Research: 1-19 (Mar. 22, 2017), arXiv, US.

Tramèr, Florian, et al., "Ensemble Adversarial Training: Attacks and Defenses," arXiv:1705.07204, Conference Paper at International Conference on Learning Representations 2018: 1-22 (Jan. 30, 2018), arXiv, US.

Madry, Aleksander et al., "Towards Deep Learning Models Resistant to Adversarial Attacks," arXiv:1706:06083, Conference Paper at International Conference on Learning Representations 2018: 1-28 (Nov. 9, 2017), arXiv, US.

Dong, Yinpeng et al., "Boosting Adversarial Attacks with Momentum," arXiv:1710.06081, CVPR 2018: 1-12 (Mar. 22, 2018), arXiv, US.

Zhang, Hongyang et al., "Theoretically Principled Trade-Off between Robustness and Accuracy," arXiv:1901:08573, Conference paper at International Conference on Machine Learning: 1-31 (Jun. 24, 2019), arXiv, US.

Liu, Xuanqing et al., "Adv-BNN: Improved Adversarial Defense Through Robust Bayesian Neural Network," arXiv:1810.01279, Clinical Orthopedics and Related Research: 1-3 (May 4, 2019), arXiv, US.

Wong, Eric et al., "Fast is better than free: Revisiting adversarial training," arXiv:2001.03994, Conference Paper at ICLR 2020, pp. 1-17 (Jan. 12, 2020), arXiv, US.

Moosavi-Dezfooli, Seyed-Mohsen et al., "DeepFool: a simple and accurate method to fool deep neural networks," arXiv:1511.04599, In Proceedings of IEEE Conference on Computer Vision and Pattern Recognition (CVPR) 2016, pp. 1-9 (Jul. 4, 2016), arXiv, US.

Wang, Yue et al., "Stop-and-Go: Exploring Backdoor Attacks on Deep Reinforcement Learning-based Traffic Congestion Control Systems," arXiv:2003.07859, pp. 1-19 (Jun. 8, 2020), arXiv, US.

Zimmermann, Roland S., "Comment on 'Adv-BNN: Improved Adversarial Defense Through Robust Bayesian Neural Network'," arXiv:1907.00895 (Jul. 2, 2019), arXiv, US.

Pasquini, Cecilia and Rainer Böhme, "Trembling triggers: exploring the sensitivity of backdoors in DNN-based face recognition," EURASIP Journal on Information Security, Jun. 23, 2020, pp. 1-15, Springer, Germany.

Gu, Tianyu et al. "BadNets: Identifying Vulnerabilities in the Machine Learning Model Supply Chain," arXiv:1708.06733 (Mar. 11, 2019), arXiv, US.

\* cited by examiner

SECURING MACHINE LEARNING MODELS AGAINST ADVERSARIAL SAMPLES THROUGH BACKDOOR MISCLASSIFICATION

CROSS-REFERENCE TO PRIOR APPLICATION

Priority is claimed to U.S. Provisional Application No. 63/158,387 filed on Mar. 9, 2021, the entire contents of which is hereby incorporated by reference herein.

FIELD

The present invention relates to a method, system and computer-readable medium for detecting adversarial samples usable in Artificial Intelligence (AI) applications and, in particular, for securing machine learning models and neural networks.

BACKGROUND

Gradual improvement and evolution of machine learning has made it an integral part of many day-to-day technical systems. Often machine learning is used as a vital part of technical systems in security related scenarios. Attacks and/or a lack of robustness of such models under duress can therefore result in security failures of the technical systems.

In particular, in the past decades, neural network-based image classification has seen an immense surge of interest due to its versatility, low implementation requirement and accuracy. However, neural networks are not fully understood and vulnerable to attacks, such as attacks using adversarial samples, which are carefully crafted modifications to normal samples that can be indistinguishable to the eye, in order to cause misclassification.

Deep learning has made rapid advances in the recent years fueled by the rise of big data and more readily available computation power. However, it has been found to be particularly vulnerable to adversarial perturbations due to being overconfident in its predictions. The machine learning community has been grappling with the technical challenges of securing deep learning models. Adversaries are often able to fool the machine learning models by introducing carefully crafted perturbations to a valid data sample. The perturbations are chosen in such a way that they are as small as possible to go unnoticed, while still being large enough to change the original correct prediction of the model. For example, in the domain of image recognition, this could be modifying the image of a dog to change the model's correct prediction of a dog to a prediction of some different animal, while keeping the modified image visually indistinguishable from the original.

Protecting against attacks on neural networks or machine learning models presents a number of technical challenges, especially since mistakes will always exist in practical models due to the statistical nature of machine learning. An existing proposed defense against attacks is based on hiding the model parameters in order to make it harder for adversaries to create adversarial samples. However, recent research has shown that adversarial samples created on surrogate models (locally trained models on a class similar to the model to attack) transfer on the targeted model with high probability (>90%), and this property holds even in the cases where the surrogate model does not have the same internal layout (e.g., different number of layers/layer sizes) nor the same accuracy (e.g., surrogate ~90% vs. target ~99%) as the target model. A surrogate model is an emulation of the target model. It is created by an attacker who has black-box access to the target model such that the attacker can specify any input x of its choice and obtain the model's prediction $y=f(x)$. Although the parameters of the target model are usually kept hidden, researchers have shown that effective surrogate models can be obtained by training a machine learning model on input-output pairs $(x,f(x))$ and are "effective" in the sense that most adversarial samples bypassing the surrogate model also fool the target model.

Goodfellow, Ian J., et al., "Explaining and Harnessing Adversarial Examples," arXiv:1412.6572, Conference Paper at International Conference on Learning Representations 2015: 1-11 (Mar. 20, 2015); Kurakin, Alexey, et al., "Adversarial Examples in the Physical World," arXiv:1607.02533, Workshop at International Conference on Learning Representations 2017: 1-14 (Feb. 11, 2017); Carlini, Nicholas, et al., "Towards Evaluating the Robustness of Neural Networks," arXiv:1608.04644, Clinical Orthopedics and Related Research: 1-19 (Aug. 13, 2018); Tramer, Florian, et al., "Ensemble Adversarial Training: Attacks and Defenses," arXiv:1705.07204, Conference Paper at International Conference on Learning Representations 2018: 1-22 (Jan. 30, 2018); Madry, Aleksander, et al., "Towards Deep Learning Models Resistant to Adversarial Attacks," arXiv:1706.06083, Conference Paper at International Conference on Learning Representations 2018: 1-28 (Nov. 9, 2017); Dong, Yinpeng, et al., "Boosting Adversarial Attacks with Momentum," arXiv:1710.06081, CVPR 2018: 1-12 (Mar. 22, 2018); Zhang, Hongyang, et al., "Theoretically Principled Trade-Off between Robustness and Accuracy," arXiv:1901:08573, Conference paper at International Conference on Machine Learning: 1-31 (Jun. 24, 2019); Liu, Xuanqing, et al., "Adv-BNN: Improved Adversarial Defense Through Robust Bayesian Neural Network," arXiv:1810.01279, Clinical Orthopedics and Related Research: 1-3 (May 4, 2019); Wong, Eric, et al., "Fast is better than free: Revisiting adversarial training," arXiv:2001.03994, Conference Paper at ICLR 2020, pp. 1-17 (Jan. 12, 2020); Moosavi-Dezfooli, Seyed-Mohsen, et al., "DeepFool: a simple and accurate method to fool deep neural networks," arXiv:1511.04599, In Proceedings of IEEE Conference on Computer Vision and Pattern Recognition (CVPR) 2016, pp. 1-9 (Jul. 4, 2016); Wang, Yue, et al., "Stop-and-Go: Exploring Backdoor Attacks on Deep Reinforcement Learning-based Traffic Congestion Control Systems," arXiv:2003.07859, pp. 1-19 (Jun. 8, 2020); and Zimmermann, Roland S., "Comment on 'Adv-BNN: Improved Adversarial Defense Through Robust Bayesian Neural Network'," arXiv:1907.00895 (Jul. 2, 2019), each discuss different attacks including subtle attacks (Goodfellow, Ian J., et al. and Tramer. Florian, et al.) and stronger attacks (Carlini, Nicholas, et al. and Madry, Aleksander, et al.), which are referred to below. Each of the foregoing publications is hereby incorporated by reference herein in their entirety.

SUMMARY

In an embodiment the present invention provides a method for securing a genuine machine learning model against adversarial samples. The method includes a step a) of attaching a trigger to a sample to be classified and a step b) of classifying the sample with the trigger attached using a backdoored model that has been backdoored using the trigger. In a step c), it is determined whether an output of the backdoored model in step b) is the same as a backdoor class of the backdoored model, and/or an outlier detection method is applied to logits from step b) compared to honest logits that were computed using a genuine sample that had the trigger attached and was applied to the backdoored model. According to a step d), these steps a)-c) are repeated using different triggers and backdoored models respectively associated with the different triggers. In a step e), it is compared a number of times that a respective one of the outputs of the backdoored models is not the same as a respective one of the backdoor classes of the backdoored models, and/or a difference determined by applying the outlier detection method, against a predetermined threshold and/or difference threshold so as to determine whether the sample is an adversarial sample.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Embodiments of the present invention improve security against attacks and adversarial samples in AI and machine learning applications. For example, flaws and vulnerabilities of neural networks which enable attacks by adversarial samples are addressed by embodiments of the present invention which generate and utilize carefully backdoors in machine learning models to detect such adversarial samples and reject them. In particular, embodiments of the present invention provide to detect adversarial samples by comparing behavior of the samples when evaluated on a backdoored model with a trigger attached to the behavior of honest samples.

Threat Model

The threat model according to embodiments of the present invention considers a white-box attack scenario where an adversary has the full knowledge and access to the machine learning model M. The adversary is free to learn from the model via unlimited query-response pairs. However, the adversary is not allowed to manipulate the model or the training process in any way, e.g. by poisoning the data used to train the model.

The goal of the adversary is given a sample S classified (correctly) as y=M(S) to create an adversarial sample S' that is classified as y' with y≠y'. Since the differences between S and S' should be small enough to be undetectable to the human eye, the adversary is therefore limited in the possible modifications which can be made to the original sample S. This is instantiated by limitation in distances, such as rms(S'−S)<8, limiting the root mean square pixel to pixel distance to 8 out of 255.

The goal of the solution according to embodiments of the present invention is, given a sample S, output y←M(S) if S is an honest (genuine) sample, and reject the sample S where it is determined to be an adversarial sample.

Attack Instantiation

In essence, attacks try to fool the machine learning models by estimating the minute perturbations to be introduced that alter the model's predictions. White-box attacks achieve this by picking a valid input sample and iteratively querying the model with minor perturbations in each step which are chosen based on the response of the classifier. Thus, the attacker tries to predict how the perturbations affect the classifier and responds adaptively. The perturbation added at each step differs depending on the attack type. The final goal of the adversary is to have genuine sample s with original target $y_s$ transformed into adversarial sample $s_a$ (with rms $(s-s_a)$<Max_Perturbation) fall into target class $y_a \neq y_s$.

Many existing defense proposals work on ad-hoc attacks, but fail to thwart adaptive adversaries, i.e. adversaries that adapt their attack based on their knowledge of the defenses. As discussed above, this field is currently heavily explored and there are many existing attacks to consider, as well as many technical challenges to overcome, when building a defense strategy. With respect to each of the attacks discussed in the existing literature, there also exists modified adaptive versions of these attacks which also pose significant security threats.

One existing defense strategy aims at cleansing potential adversarial samples by performing transformation on the input sample, such as adding randomness and applying filters. This approach has two drawbacks: first, it reduces the accuracy of the model, and second, defenses relying on this approach can be bypassed by an adaptive attacker with knowledge of the transformation. Another existing defense strategy relies on "strengthening" the model to be resilient to attacks, by including adversarial samples in the training set. While this type of defense again works relatively well on ad hoc attacks, it is less efficient against targeted attacks that can still reach up to 60% accuracy. Furthermore, each of these existing defense strategies suffer from an extremely slow learning process and are therefore quite hard to setup. It is also unclear if these existing defense strategies can be resilient to attacks using a different attack tactics than the ones currently known.

Model Poisoning

Another common attack of a machine learning model is called model poisoning. This type of attack relies on poisoning the training set of the model before the training phase. The poisoning step happens as follow: select samples S, attach them with a trigger t and change their target class to $y_t$. The newly created samples will ensure that the model will be trained to recognize the specific trigger t and always classify images with it into the target class $y_t$. The trigger can be any pattern, from a simple visual pattern such as a yellow square, to any subtle and indistinguishable pattern added to the image. In image-recognition applications, the trigger can be any pixel pattern. However, triggers can also be defined for other classification problems, e.g., speech or word recognition (in these cases, a trigger could be a specific sound or word/sentence, respectively). Poisoning a model has a minimal impact on its overall accuracy. The terms "backdoor" and "poison" are used interchangeably herein.

The exact manner an adversary can access training data depends on the application for which the machine learning classifier is deployed. Model poisoning is possible in all of those scenarios where training data are collected from non-trustworthy sources. For instance, the federated learning framework of GOOGLE allows training a shared model using data provided by volunteering users. Therefore, anybody may join the training process, including an attacker. As mentioned above, attackers can experiment with the model or surrogate models to see how a trigger added to a sample changes its classification, thereby changing the target class.

To poison an already existing (and trained) model, a data poisoning approach is used according to embodiments of the present invention, which only requires a few additional rounds of training using poisoned samples. In order to poison the model, firstly, a trigger, which is a pattern that will be recognized by the model, is generated. The trigger is then attached to certain images of the training set and their target class is changed to the backdoor target class (e.g., by changing a label of an image). Following this, a few rounds of training containing both genuine training data and poisoned training data are performed, until the backdoor accuracy reaches a satisfying value (e.g., 90% accuracy). The genuine data can be advantageously used in this step to ensure that the model, after being trained with backdoored samples, is still able to correctly classify samples which do not contain the backdoors. This step does not require an immense amount of data such as required during the normal training phase of the model, and permits quick insertion of perturbations in the model at a negligible cost in term of accuracy.

Defense Via Backdoor Misclassification

Based on the current the state of the art, it is estimated that it is potentially impossible to defend against adversarial samples from adversaries with complete knowledge of the system. It is also potentially impossible to keep the machine learning model and its weights fully private. Therefore, embodiments of the present invention aim to change the paradigm and create some asymmetry between the attacker's knowledge and the defender's knowledge. To this end, embodiments of the present invention provide a defense that is based on self-poisoning the model, in order to detect potential adversarial samples. In particular, genuine samples with a trigger t attached and evaluated on a backdoored model $M_t$ are expected to fall into the backdoor target class $y_t$, however this is not always the case for adversarial samples, which sometimes still fall into the target attack class $y_a$ instead of the backdoored class.

The perturbation introduced in adversarial samples can be seen as a weak trigger on an intrinsic backdoor-like behavior of the model. Therefore, if the backdoored model generated is close enough to the original model and there is a weak enough trigger, adversarial samples might still be misclassified even when evaluated with the trigger on the backdoored model. Since adding a backdoor to a model is relatively quick, it is advantageously possible to use the following updated threat model: the adversary has complete knowledge of the original non-backdoored model M, but knows nothing about the backdoored model nor their triggers, which is advantageously secret information known only by the defender.

Figure 1:
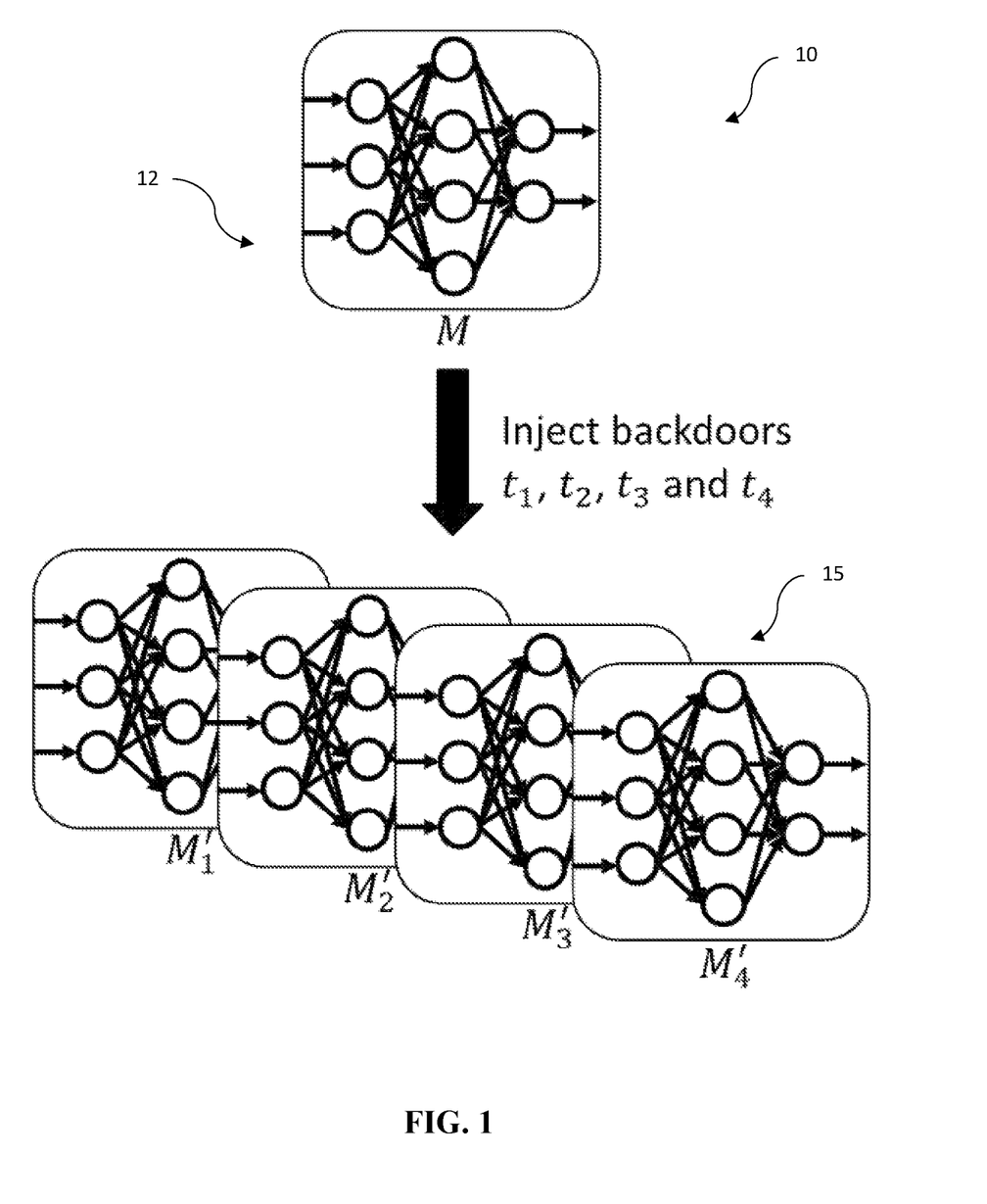
FIG. 1 schematically illustrates a setup phase according to an embodiment of the present invention.
Figure 2:
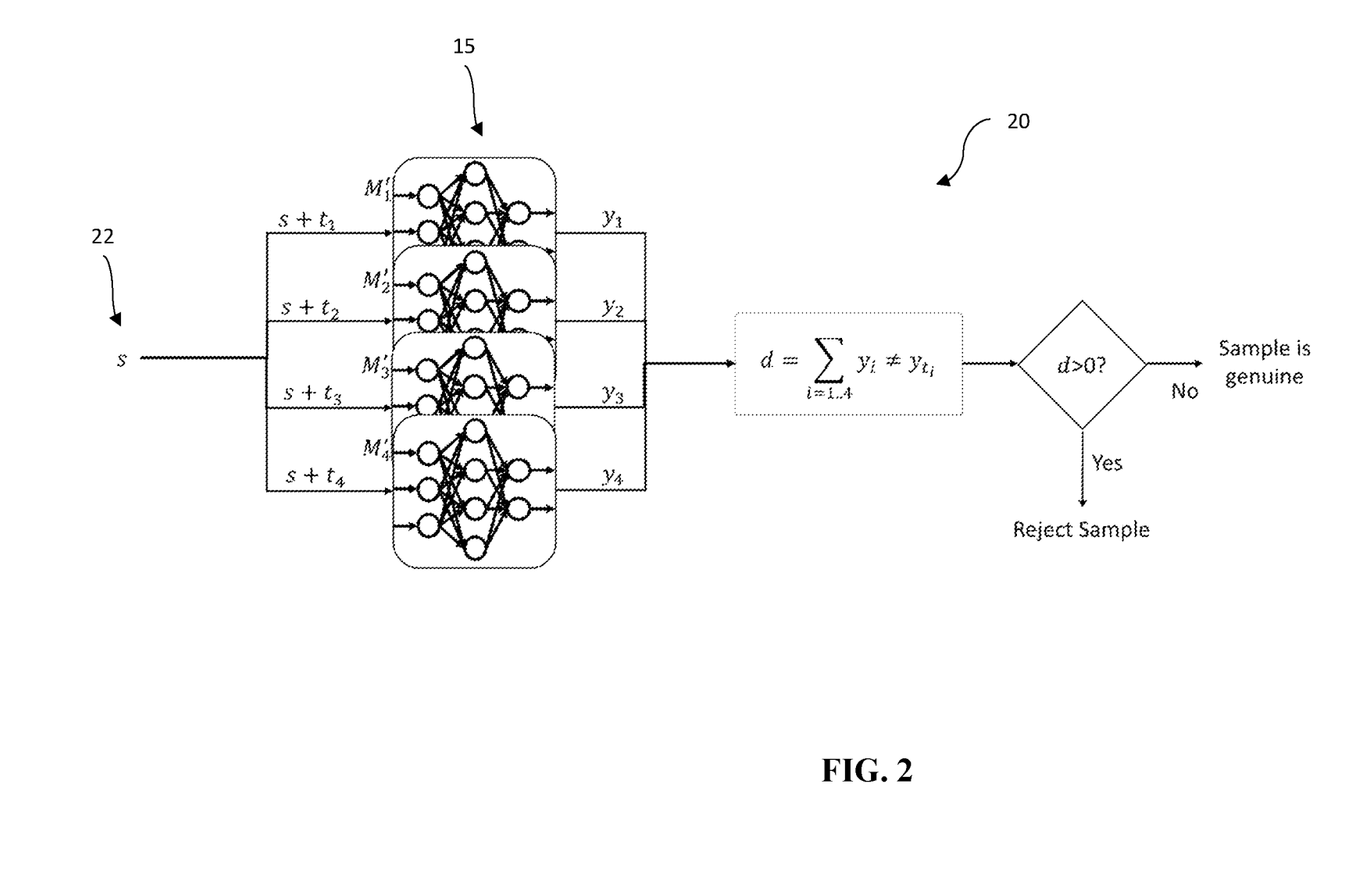
FIG. 2 schematically illustrates an evaluation phase according to an embodiment of the present invention.

The defense relies on generating quickly N backdoored versions of the model $M'_{1 \ldots N}$ based on their respective triggers $t_N$ which are unknown to the adversary, as shown in FIG. 1. Afterwards, each classification request r goes through the following flow, as depicted in FIG. 2 in a simplified manner using a σ=0:

| | |
|---|---|
| 1. | $y_0 \leftarrow M(s)$ |
| 2. | diff ← 0 |
| 3. | For i in 1..N:: |
| | a. $y_i \leftarrow M_i'(s + t_i)$ |
| | b. If yi ≠ $y_0$ then diff + + |
| 4. | If diff > σ * N then REJECT |
| 5. | else return $y_0$ | where diff is a counter and diff++ adds one to the counter and, in this embodiment, the threshold σ is a percentage or value between [0,1] such that the algorithm can be applied to any number of N backdoored versions of the model $M'_{1 \ldots N}$.

In an embodiment the present invention provides a method for securing a genuine machine learning model against adversarial samples. The method includes a step a) of attaching a trigger to a sample to be classified and a step b) of classifying the sample with the trigger attached using a backdoored model that has been backdoored using the trigger. In a step c), it is determined whether an output of the backdoored model in step b) is the same as a backdoor class of the backdoored model, and/or an outlier detection method is applied to logits from step b) compared to honest logits that were computed using a genuine sample that had the trigger attached and was applied to the backdoored model. According to a step d), these steps a)-c) are repeated using different triggers and backdoored models respectively associated with the different triggers. In a step e), it is compared a number of times that a respective one of the outputs of the backdoored models is not the same as a respective one of the backdoor classes of the backdoored models, and/or a difference determined by applying the outlier detection method, against a predetermined threshold and/or difference threshold so as to determine whether the sample is an adversarial sample.

In an embodiment, the method further comprises classifying the sample without any of the triggers attached using the genuine machine learning model as a result of a classification request for the sample in a case that the number of times that a respective one of the outputs of the backdoored models is not the same as a respective one of the backdoor classes of the backdoored models is less than or equal to the threshold; and rejecting the sample as the adversarial sample in a case that the number of times that a respective one of the outputs of the backdoored models is not the same as a respective one of the backdoor classes of the backdoored models is greater than the threshold.

In an embodiment, the method further comprises flagging the sample as tampered in the case that the number of times that a respective one of the outputs of the backdoored models is not the same as a respective one of the backdoor classes of the backdoored models is greater than the threshold. In an embodiment, the threshold is zero.

In an embodiment, each of the backdoored models are generated by: generating a respective one of the triggers as a pattern recognizable by the genuine machine learning model; adding the respective trigger to a plurality of training samples; changing a target class of the training samples having the respective trigger added to a respective one of the backdoor classes; and training another version of the genuine machine learning model using the training samples having the respective trigger added.

In an embodiment, the training is performed until the respective backdoored model has an accuracy of 90% or higher.

In an embodiment, the genuine machine learning model and the version of the genuine machine learning model are each trained, and wherein the training of the version of the genuine machine learning model using the training samples having the respective trigger added is additional training to create the respective backdoored model from the genuine machine learning model.

In an embodiment, the additional training includes training with genuine samples along with the samples having the respective trigger added.

In an embodiment, the classifying of step b) comprises extracting the logits in the classification of the sample having the trigger attached using the backdoored model, wherein an output class of the backdoored models are not used for determining whether the sample is the adversarial sample, and wherein, in step e), the logits from step b) are compared to a set of honest logits that were computed using a plurality of genuine samples that had respective ones of the triggers attached and were applied to each of the backdoored models.

In an embodiment, the method further comprises classifying the sample without any of the triggers attached using the genuine machine learning model as a result of a classification request for the sample in a case that results of the outlier detection method for each of the logits is less than or equal to the difference threshold; and rejecting the sample as the adversarial sample in a case that the results of the outlier detection method for each of the logits is greater than the difference threshold. In an embodiment, the outlier detection method uses a local outlier factor algorithm.

In an embodiment, the genuine machine learning model is based on a neural network and trained for image classification.

In another embodiment, the present invention provides a system for securing a genuine machine learning model against adversarial samples, the system comprising one or more hardware processors configured, alone or in combination, to facilitate execution of the following steps: a) attaching a trigger to a sample to be classified; b) classifying the sample with the trigger attached using a backdoored model that has been backdoored using the trigger; c) determining whether an output of the backdoored model in step b) is the same as a backdoor class of the backdoored model, and/or applying an outlier detection method to logits from step b) compared to honest logits that were computed using a genuine sample that had the trigger attached and was applied to the backdoored model; d) repeating steps a)-c) using different triggers; and e) comparing a number of times that a respective one of the outputs of the backdoored models is not the same as a respective one of the backdoor classes of the backdoored models, and/or a difference determined by applying the outlier detection method, against a predetermined threshold and/or difference threshold so as to determine whether the sample is an adversarial sample.

In an embodiment, the system is further configured to: classify the sample without any of the triggers attached using the genuine machine learning model as a result of a classification request for the sample in a case that the number of times that a respective one of the outputs of the backdoored models is not the same as a respective one of the backdoor classes of the backdoored models is less than or equal to the threshold; and reject the sample as the adversarial sample in a case that the number of times that a respective one of the outputs of the backdoored models is not the same as a respective one of the backdoor classes of the backdoored models is greater than the threshold.

In a further embodiment, the present invention provides a tangible, non-transitory computer-readable medium having instructions thereon, which, upon execution by one or more processors, secure a genuine machine learning model by facilitating execution of the steps of any method according to an embodiment of the present invention.

FIG. 1 schematically illustrates a setup phase 10 according to an embodiment of the present invention. The setup phase 10 begins with an existing (trained) machine learning model 12. A plurality of N backdoored models 15 are generated from the existing machine learning model 12 in each case by additional training of the existing machine learning model 12 with samples having different triggers $t_1$, $t_2$, $t_3$ and $t_4$ attached. A trigger is any pixel pattern added to the sample which is recognizable by the existing machine learning model 12, but is mostly subtle and indistinguishable from the non-modified sample to a human observer. Preferably, each backdoored model $M'_1$, $M'_2$, $M'_3$ and $M'_4$ is associated with a respective one of the triggers $t_1$, $t_2$, $t_3$ and $t_4$, and the triggers $t_1$, $t_2$, $t_3$ and $t_4$ differ from each other. Also preferably, the data samples used to train the various backdoored models 15 are created from the same training set, by attaching the respective trigger associated to each given model to be backdoored and correspondingly changing the label to the target backdoor class. Therefore, although they can be generated from the same dataset, these training samples differ across backdoored models according to an embodiment of the present invention.

FIG. 2 schematically illustrates an evaluation phase 20 according to an embodiment of the present invention. A sample 22 is being provided as an input to an existing genuine machine learning model 12 (e.g., for classification of an image in response to a classification request) or for training such a model, and it is to be evaluated whether the sample 22 is a genuine or an adversarial sample. The triggers $t_1$, $t_2$, $t_3$ and $t_4$ that were used to train the respective backdoored models $M'_1$, $M'_2$, $M'_3$ and $M'_4$ are added to the sample 22 and in each case applied as input to the respective one of the backdoored models 15 (trigger $t_1$ added to sample s is applied as input to model $M'_1$ which was backdoored using the trigger $t_1$, and so on), resulting in respective classes as outputs $y_1$, $y_2$, $y_3$, $y_4$. The number of times that one of the outputs $y_i$ from one of the backdoored model 15 is different from the target backdoor class $y_{t_i}$ of the respective one of the models 15 is determined as sum d. The target backdoor class $y_{t_i}$ is in each case determined by the classification result associated with the respective trigger $t_i$ (e.g., backdoor class $y_{t_i}$ corresponds to the class associated with the trigger $t_1$, and so on). This sum d, which can be normalized to use any number of backdoored models 15, is compared to a predetermined threshold σ. In this example, σ is zero and therefore the sample is determined to be genuine if all of the backdoored models 15 provide a respective output $y_i$ that is equal to the respective backdoor class $y_{t_i}$; otherwise, the sample 22 is determined to be an adversarial sample that has been tampered with, and it is rejected, and preferably also flagged as tampered. In the case it is determined that the sample 22 is a genuine sample, it can be applied, without any of the triggers applied, as input to, or for training, the genuine machine learning model, and can return the output as the result of a classification request.

Figure 3:
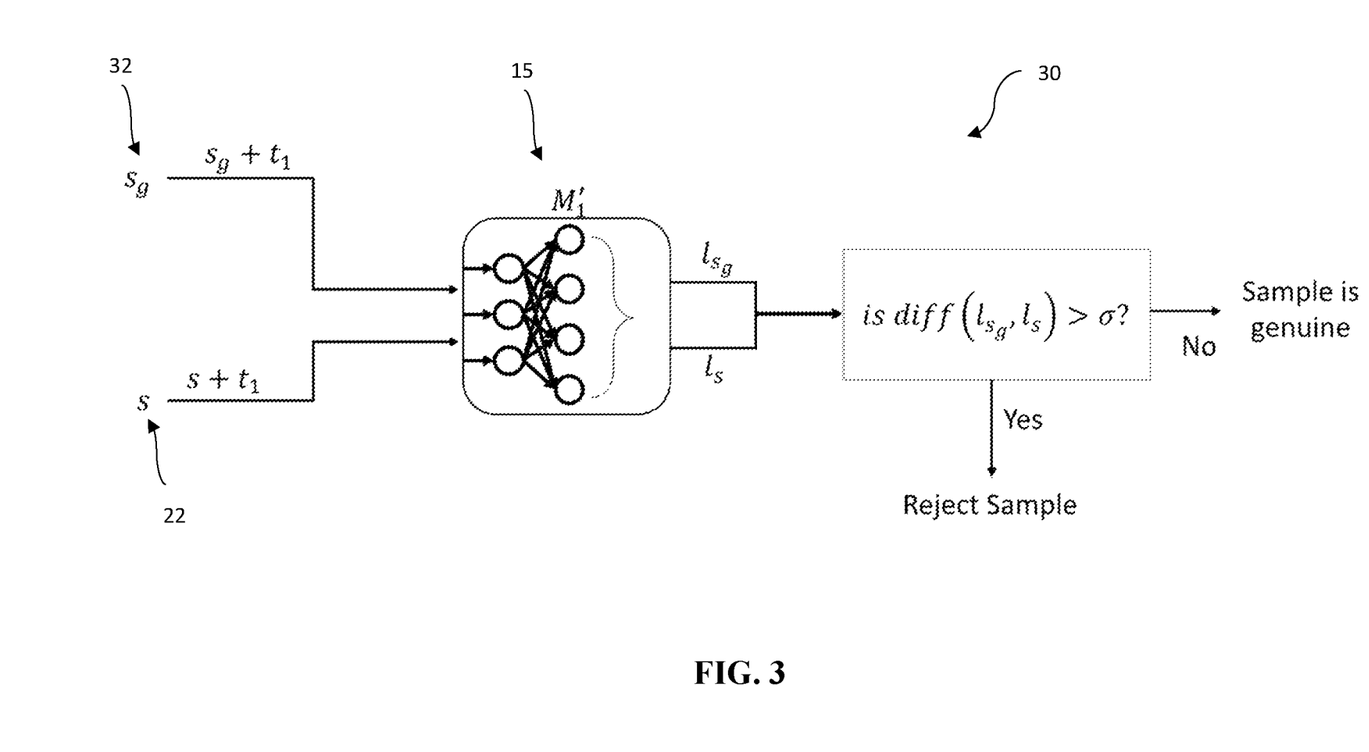
FIG. 3 schematically illustrates an improved evaluation using one backdoored model according to an embodiment of the present invention.

FIG. 3 schematically shows an evaluation phase 30 in accordance with another embodiment of the present invention. First, for example during the set-up phase, triggers are added to genuine samples 32 and classified using the backdoored model 15 associated in each case with the respective trigger. FIG. 3 shows an example of a trigger $t_1$ being added to a genuine sample $s_g$ and being classified using the backdoored model $M'_1$ associated with the trigger $t_1$. To improve detection accuracy, multiple triggers and multiple models associated with the respective triggers are used, as in embodiments described above. However, here the result of the classification using the backdoored model 15 which is used are the logits l, which is the second to last layer of the backdoored model 15. The last layer, which is referred to as the softmax layer is discarded or excluded from the evaluation. It was discovered according to an embodiment of the present invention that the softmax layer discards some information useful for determining whether a sample is an adversarial sample and that, by using the logits l, the accuracy of identifying adversarial samples could be even further improved. The logits $l_{s_g}$ designate the set of logits produced from applying, in each case, the respective genuine sample 32 with the respective trigger added to the respective backdoored model 15, and represent genuine behaviors of genuine samples 32. The trigger is added to a sample 22, for which it is to be determined whether the sample 22 is a genuine sample or an adversarial sample, and is applied as input to the backdoored model 15, resulting in logits $l_s$. The resulting logits $l_s$ are compared by a function is diff (e.g., a similarity or distance measure such as L distances or, preferably, a local outlier factor (LOF) algorithm) to the set of genuine logits $l_{s_g}$ and it is determined if the result is greater than a predetermined difference threshold $\sigma$. If the result of function is diff is greater than the predetermined difference threshold $\sigma$, it is determined that the sample 22 is an adversarial sample, and is rejected, and preferably flagged as tampered. Otherwise, if the result of function is diff is less than or equal to the predetermined difference threshold $\sigma$, it is determined that the sample 22 is a genuine sample, and it can be applied, without any trigger, as input to, or for training, the genuine machine learning model, and can return the output as the result of a classification request.

LOF is an existing anomaly-detection method to identify outliers in a dataset by inspecting the proximity of a point to its neighbors compared to the neighbors' own proximity. Given an integer parameter k, a point x and some neighboring points {x1, . . . , xn}, the local outlier factor LOFk(x;N) provides a degree of deviation or "outlierness" based on the proximity of x to its k closest neighbors. For example, LOFk(x;N)>1 indicates that x is less clustered than the other points, and potentially an outlier.

According to an embodiment, the predetermined difference threshold $\sigma$ is based on the output using multiple genuine samples (i.e. $s_{g_1}$ . . . $s_{g_n}$ into logits $$l_{s_{g_1}} ... l_{s_{g_n}})$$

and if the distance between the different logits $l_{s_g}$ with $l_s$ is bigger than the average distance between the logits (e.g., with some added tolerance), then the sample is reported as adversarial.

Figure 4:
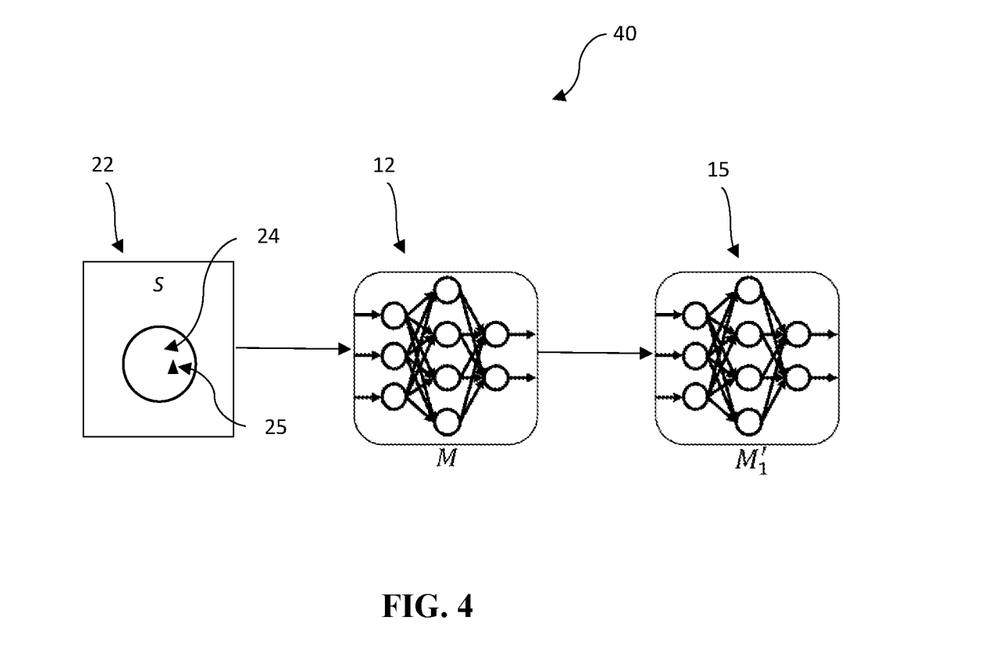
FIG. 4. schematically illustrates the creation of a backdoored model according to an embodiment of the present invention.

FIG. 4 schematically illustrates a method 40 for the generation of one of the backdoored models 15 of FIG. 1 in the setup phase 10. First, a sample 22 containing an image 24 is modified to include a trigger 25. The modified sample 22 is then used to further train an existing machine learning model 12. This process is repeated with different samples modified to include the same trigger until accuracy reaches a satisfactory value (e.g., ~90% of the samples having the same triggered will be misclassified in the same way). Ideally, a backdoored model should predict all samples containing a given trigger as belonging to the target class associated to that trigger. Preferably, the number of newly created samples is around 100 or more. It has been discovered that good results can be achieved already with just around 10 backdoored models.

The usage of multiple backdoored models improves the detection accuracy of the system as a whole. Moreover, this solution according to embodiments of the present invention has proven effective to detect strong adversarial samples and ensure proper transferability even in the case of adversarial robustness. Although accuracy is not as high against "subtle" adversarial samples, the solution can be particularly advantageously applied according to embodiments of the present invention as the first layer of a multi-layered defense system.

This solution of using backdoored models according to embodiments of the present invention was evaluated on the attacks discussed in the existing literature mentioned above. This evaluation empirically demonstrated the improvements in security of machine learning models against adversarial samples provided by embodiments of the present invention. A false negative rate up to 0% was achieved on the "strongest" attacks, while the false positive rate was around 6%. Increasing the threshold $\sigma$ reduces the false positive rate while increasing the false negative rate.

Another approach by Applicant uses poisoned models for adversarial sample detection and, by comparison, is aimed at preventing transferability. In particular, this other approach relies on the fact that poisoned models can be vastly different than their genuine counterpart, and "weak" adversarial samples would not be misclassified due to those differences. In contrast, embodiments of the present invention rely on the behavior differences between genuine samples and adversarial samples when classified on a poisoned model with the trigger attached. This difference in approach creates a large difference in results. Whereas the previous approach is particularly very successful against subtle attacks, it would not be as effective against attacks that are optimized for transferability. Embodiments of the present invention, on the other hand, would be more effective in catching such attacks since an increase in transferability also result in an increase in behavioral differences when classified over poisoned models. The different approaches could be used in a complementary manner to enhance security over different types of attacks and achieve a greater overall security to machine learning computer system and network.

Improved Defense

A further improvement over previously proposed defenses according to an embodiment of the present invention relies on the last logits l instead of and/or in addition to using the classification output of the system, as shown in FIG. 3. Advantageously, it is possible, but not necessary, in this embodiment to determine whether the backdoored models would output the backdoor class or not. In this improvement, the last layer of the model is discarded. The last layer of the model is referred to as the softmax layer and is used to map the output of the neural network from real numbers to a probability distribution $\mathbb{R}^n \to [0,1]^n$. While this layer is usually very useful to understand the confidence of the model over the classification, it also discards some information that can potentially be used to detect adversarial samples. Embodiments of the present invention place the output of the modified models in vectors l. The defense then relies on a pool of genuine samples $s_g$ that are used to compute the genuine behavior of the model into the vector $l_{s_g}$ (which potentially could contain thousands of results). Upon reception of a new sample s, the output of this sample $l_s$ is then compared with the genuine behavior output $l_{s_g}$ to decide on the genuineness of the received sample.

The function is diff" can be implemented in a multitude of ways. For example, it is possible to use L distances. Another possibility providing better results is to use an outlier detection system such as local outlier factor (LOF), a method typically to used decide whether a given input is an outlier from a set of inputs based on its closest neighbors density. Using LOF, improvements in accuracy were demonstrated. The accuracy of subtle attacks improved from a false negative rate of 95% to a false negative rate between 40% (for the attack described in Kurakin, Alexey, et al.) and 55% (for the attacks described in Moosavi-Dezfooli, Seyed-Mohsen, et al. and in Goodfellow, Ian J., et al.). The accuracy of strong attacks remained at a 0% false negative rate (for the attacks described in Carlini, Nicholas, et al. and Madry, Aleksander, et al.) while the optimized attack false negative rate was also heavily reduced from 80% to around 25%. Using further optimization, it was also possible to improve the accuracy further in order to ensure further enhanced security. Subtle attacks refer to attack strategies that minimize the adversarial perturbation, while strong attacks refer to attack strategies that optimize for generating high-confidence adversarial samples.

Examples of Adversarial Samples

While the attack is described above based only on its digital version (e.g., digitally altered adversarial samples) due to the increased strength of the adversary in this case, it has been shown that physical adversarial samples are also possible and that embodiments of the present invention can also be applied to detect such attacks as well. For example, through such an attack, a malicious party could fool the algorithms of a self-driving car by adding some minute modifications to a stop sign so that it is recognized by the self-driving car as a different sign. The exact process of the attacker could involve generating a surrogate model of a traffic sign recognition model and investigating how to change a sign to cause misclassification. The attacker can then evaluate the success rate of the attack by borrowing/buying a car with the autonomous driving system targeted and check how the software reacts to the modified sign. While this kind of attack may not provide any financial benefit to the attacker, it presents significant public security risks and could engage the liability of the manufacturer of the car in case of an accident.

Similarly, a potential use case of such an attack could target a face recognition system. Adversarial samples in this case could be generated and used either to evade the recognition of a genuine subject (obfuscation attack), or to falsely match the sample to another identity (impersonation attack). Such attacks could result in financial and/or personal harm, as well as breaches of technical security systems where unauthorized adversaries gain access to secure devices or facilities.

Embodiments of the present invention thus provide for the improvements of:
1. Increasing the security of machine learning models, as well as improvements in the technical fields of application of the machine learning models having the enhanced security.
2. Leveraging the output of backdoored models to differentiate adversarial samples from honest samples by using a pool of reference of known genuine samples.
3. Generating and utilizing a backdoored variant of a machine learning model using a trigger that is not known to the adversary and detecting adversarial samples by comparing the output of the classification of those samples with a trigger attached evaluated on the backdoor variants with the output of the classification of genuine samples with a trigger attached.
4. Generating and using N backdoored variants of the model using n different triggers that are not known to the adversary and detecting adversarial samples by checking the output of the classification of those samples on the N backdoored variants.
5. Reduced and insignificant loss of accuracy compared to existing defense strategies (due to some genuine samples being erroneously rejected).
6. Enhanced security against adversaries having knowledge of the defense compared to existing defense strategies.

According to an embodiment of the present invention, a method for increasing security of a machine learning model against an adversarial sample comprises:

Setup Phase:
  Receiving a classification model M
  Generate backdoored models $M'_1, \ldots, M'_N$ locally using the random triggers $t_1, \ldots, t_N$ Detection Phase:
  Upon reception of a samples to classify:
    For each backdoored model $M'_1, \ldots, M'_N$ classify a sample s on the backdoored model $M'_i$ with the trigger $t_i$ attached $(y_t \leftarrow M'_i(s+t_i))$
    Using the sets of outputs $y_{1 \ldots N}$, count the number of times the output is not equal to the backdoor class $(y_i \neq y_{t_i})$
    If the number of misclassifications is above a threshold a, then reject the sample and flag it as tampered; otherwise, output the result of the classification request on the honest model (M)

Advanced Detection:
  Additional setup:
    Select a number of genuine samples $s_g$
    For each genuine sample $s_g$, compute the logits l of the sample s on each of the backdoored model $M'_{i \ldots N}$ and store in the set of logits output $l_{i,s_g}$
  Detection:
    Upon reception of a sample s to classify
      For each backdoored model $M'_{i \ldots N}$, classify the sample s on the backdoor model $M'_i$ with the trigger $t_i$ attached $(y_i \leftarrow M'_i(s+t_i))$ and extract the logits as $l_i$
      For each backdoored model $M'_{i \ldots N}$, apply an outlier detection method (such as LOF) on the logits $l_i$ compared to the set of honest logits $l_{i,s_g}$ generated using the respective backdoored model
      If more than $\sigma N$ backdoored models $M_i$ detect the logits vector $l_i$ as an outlier, where a $\sigma \in [0,1]$ is a pre-determined threshold, the corresponding sample s is rejected. The mechanism is similar to that illustrated in FIG. 2 (where, in that example, the threshold $\sigma$ is set to $\sigma=0$), in the sense that the number of backdoored models (d in FIG. 2) that yield a specific output are not counted in this embodiment. In the example of FIG. 2, this specific output is a classification different than the target class, while in this advanced detection embodiment, the specific output is an outlier verdict. Both in the embodiments of FIG. 2 and the advanced detection, the sample is rejected if d>σN Embodiments of the present invention advantageously provide robustness against adaptive attacks by breaking the symmetric knowledge between the attacker and the defender. The trigger of the backdoored model acts as a secret key that is not known to the attacker.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for securing a genuine machine learning model against adversarial samples, the method comprising:
    a) attaching a trigger to a sample to be classified;
    b) classifying the sample with the trigger attached using a backdoored model that has been backdoored using the trigger;
    c) determining whether an output of the backdoored model in step b) is the same as a backdoor class of the backdoored model, and/or applying an outlier detection method to logits from step b) compared to honest logits that were computed using a genuine sample that had the trigger attached and was applied to the backdoored model;
    d) repeating steps a)-c) using different triggers and backdoored models respectively associated with the different triggers; and
    e) comparing a number of times that a respective one of the outputs of the backdoored models is not the same as a respective one of the backdoor classes of the backdoored models, and/or a difference determined by applying the outlier detection method, against a predetermined threshold and/or difference threshold so as to determine whether the sample is an adversarial sample.

2. The method according to claim 1, further comprising:
    classifying the sample without any of the triggers attached using the genuine machine learning model as a result of a classification request for the sample in a case that the number of times that a respective one of the outputs of the backdoored models is not the same as a respective one of the backdoor classes of the backdoored models is less than or equal to the threshold; and
    rejecting the sample as the adversarial sample in a case that the number of times that a respective one of the outputs of the backdoored models is not the same as a respective one of the backdoor classes of the backdoored models is greater than the threshold.

3. The method according to claim 2, further comprising flagging the sample as tampered in the case that the number of times that a respective one of the outputs of the backdoored models is not the same as a respective one of the backdoor classes of the backdoored models is greater than the threshold.

4. The method according to claim 3, wherein the threshold is zero.

5. The method according to claim 1, wherein each of the backdoored models are generated by:
    generating a respective one of the triggers as a pattern recognizable by the genuine machine learning model;
    adding the respective trigger to a plurality of training samples;
    changing a target class of the training samples having the respective trigger added to a respective one of the backdoor classes; and
    training another version of the genuine machine learning model using the training samples having the respective trigger added.

6. The method according to claim 5, wherein the training is performed until the respective backdoored model has an accuracy of 90% or higher.

7. The method according to claim 5, wherein the genuine machine learning model and the version of the genuine machine learning model are each trained, and wherein the training of the version of the genuine machine learning model using the training samples having the respective trigger added is additional training to create the respective backdoored model from the genuine machine learning model.

8. The method according to claim 7, wherein the additional training includes training with genuine samples along with the samples having the respective trigger added.

9. The method according to claim 1, wherein the classifying of step b) comprises extracting the logits in the classification of the sample having the trigger attached using the backdoored model, wherein an output class of the backdoored models are not used for determining whether the sample is the adversarial sample, and wherein, in step e), the logits from step b) are compared to a set of honest logits that were computed using a plurality of genuine samples that had respective ones of the triggers attached and were applied to each of the backdoored models.

10. The method according to claim 9, the method further comprising:
    classifying the sample without any of the triggers attached using the genuine machine learning model as a result of a classification request for the sample in a case that results of the outlier detection method for each of the logits is less than or equal to the difference threshold; and rejecting the sample as the adversarial sample in a case that the results of the outlier detection method for each of the logits is greater than the difference threshold.

11. The method according to claim 10, wherein the outlier detection method uses a local outlier factor algorithm.

12. The method according to claim 1, wherein the genuine machine learning model is based on a neural network and trained for image classification.

13. A system for securing a genuine machine learning model against adversarial samples, the system comprising one or more hardware processors configured, alone or in combination, to facilitate execution of the following steps:
   a) attaching a trigger to a sample to be classified;
   b) classifying the sample with the trigger attached using a backdoored model that has been backdoored using the trigger;
   c) determining whether an output of the backdoored model in step b) is the same as a backdoor class of the backdoored model, and/or applying an outlier detection method to logits from step b) compared to honest logits that were computed using a genuine sample that had the trigger attached and was applied to the backdoored model;
   d) repeating steps a)-c) using different triggers; and
   e) comparing a number of times that a respective one of the outputs of the backdoored models is not the same as a respective one of the backdoor classes of the backdoored models, and/or a difference determined by applying the outlier detection method, against a predetermined threshold and/or difference threshold so as to determine whether the sample is an adversarial sample.

14. The system according to claim 13, being further configured to:
   classify the sample without any of the triggers attached using the genuine machine learning model as a result of a classification request for the sample in a case that the number of times that a respective one of the outputs of the backdoored models is not the same as a respective one of the backdoor classes of the backdoored models is less than or equal to the threshold; and
   reject the sample as the adversarial sample in a case that the number of times that a respective one of the outputs of the backdoored models is not the same as a respective one of the backdoor classes of the backdoored models is greater than the threshold.

15. A tangible, non-transitory computer-readable medium having instructions thereon, which, upon execution by one or more processors, secure a genuine machine learning model against adversarial samples by providing for execution of the following steps:
   a) attaching a trigger to a sample to be classified;
   b) classifying the sample with the trigger attached using a backdoored model that has been backdoored using the trigger;
   c) determining whether an output of the backdoored model in step b) is the same as a backdoor class of the backdoored model, and/or applying an outlier detection method to logits from step b) compared to honest logits that were computed using a genuine sample that had the trigger attached and was applied to the backdoored model;
   d) repeating steps a)-c) using different triggers; and
   e) comparing a number of times that a respective one of the outputs of the backdoored models is not the same as a respective one of the backdoor classes of the backdoored models, and/or a difference determined by applying the outlier detection method, against a predetermined threshold and/or difference threshold so as to determine whether the sample is an adversarial sample.

* * * * *